US006710121B2

(12) United States Patent
Miller

(10) Patent No.: US 6,710,121 B2
(45) Date of Patent: Mar. 23, 2004

(54) NITROCELLULOSE-COMPATIBLE LAMINATING INK RESINS

(75) Inventor: George E. Miller, Savannah, GA (US)

(73) Assignee: Arizona Chemical Company, Jacksonville, FL (US)

( * ) Notice: Subject to any disclaimer, the term of this patent is extended or adjusted under 35 U.S.C. 154(b) by 0 days.

(21) Appl. No.: 09/861,174

(22) Filed: May 18, 2001

(65) Prior Publication Data

US 2002/0002215 A1 Jan. 3, 2002

Related U.S. Application Data

(60) Provisional application No. 60/205,702, filed on May 19, 2000.

(51) Int. Cl.[7] .......................... C08L 77/08; C08G 69/26; C08G 69/34; C08D 11/10
(52) U.S. Cl. .................... 524/607; 528/338; 528/339.3; 523/160
(58) Field of Search ...................... 524/607; 525/420.5; 528/335, 338, 339.3; 523/160, 161

(56) References Cited

U.S. PATENT DOCUMENTS

| | | | | |
|---|---|---|---|---|
| 4,066,585 A | * | 1/1978 | Schepp et al. | 524/279 |
| 4,471,088 A | | 9/1984 | Chiba et al. | 524/606 |
| 4,612,052 A | * | 9/1986 | Schwartz | 524/230 |
| 4,661,194 A | | 4/1987 | Lovald | 156/330.9 |
| 4,680,379 A | | 7/1987 | Coquard et al. | 528/336 |
| 4,861,815 A | | 8/1989 | Schultz et al. | 524/114 |
| 4,987,160 A | * | 1/1991 | Frihart et al. | 522/164 |
| 5,154,760 A | | 10/1992 | Miller, Jr. | 106/20 |
| 5,242,992 A | | 9/1993 | Poll et al. | 525/432 |
| 5,338,785 A | | 8/1994 | Catena et al. | 524/39 |
| 5,597,888 A | | 1/1997 | Nielinger et al. | 528/335 |
| 5,658,968 A | | 8/1997 | Catena et al. | 523/161 |
| 5,773,558 A | | 6/1998 | Torre | 528/335 |
| 5,851,238 A | | 12/1998 | Gadoury et al. | 8/442 |
| 5,965,689 A | | 10/1999 | Koning et al. | 528/310 |
| 6,077,900 A | * | 6/2000 | Boudreaux et al. | 524/501 |
| 6,372,841 B1 | * | 4/2002 | Anderson et al. | 524/507 |
| 2002/0156188 A1 | * | 10/2002 | Anderson et al. | 525/107 |

FOREIGN PATENT DOCUMENTS

| | | |
|---|---|---|
| EP | 0 334 667 | 9/1989 |
| EP | 0 423 577 | 4/1991 |
| EP | 1 013 694 | 6/2000 |
| GB | 1 533 230 | 11/1978 |

\* cited by examiner

*Primary Examiner*—Callie Shosho
(74) *Attorney, Agent, or Firm*—Seed Intellectual Property Law Group PLLC

(57) ABSTRACT

Nitrocellulose-compatible laminating ink resin is prepared by reacting together reactants including polymerized fatty acid, co-diacid, monoacid, secondary diamine and $C_6$ diamine, or reactive equivalents thereof. The resin may be used in printing compositions, and particularly printing compositions that also contains nitrocellulose, and that is useful in laminating printing onto plastic film.

12 Claims, No Drawings

NITROCELLULOSE-COMPATIBLE LAMINATING INK RESINS

CROSS-REFERENCE TO RELATED APPLICATION

This application claims the priority benefit of U.S. Provisional Application No. 60/205,702, filed May 19, 2000, and is incorporated herein by reference in its entirety.

TECHNICAL FIELD OF THE INVENTION

The invention relates to inks and resins useful in inks, especially to resins for laminating inks, and resins that are compatible with nitrocellulose.

BACKGROUND OF THE INVENTION

Inks for printing on flexible substrates (e.g., synthetic polymer films) and laminating inks (i.e., inks that are placed between two substrates and must both provide the traditional properties of an ink resin as well as not interfere with, and hopefully augment the adhesion between the two substrates) that contain polyamide resins are known in the art. See, e.g., U.S. Pat. Nos. 5,658,968; and 5,338,785. Historically, those polyamide resins that have a high solution viscosity and that are used in laminating inks exhibit poor ink rheology and poor compatibility with nitrocellulose. The present invention provides a solution to this problem and provides other related advantages as disclosed below.

SUMMARY OF THE INVENTION

Briefly, in one aspect, the present invention provides a polyamide resin. The polyamide resin may be described by the process by which it may be prepared. According to this description, the polyamide resin is prepared by reacting together reactants that include polymerized fatty acid, co-diacid, monoacid, secondary diamine and $C_6$ diamine, or reactive equivalents thereof, where any one of these components may be a blend of materials that meets the definitions set forth below.

In various aspect, the polymerized fatty acid includes at least 75 weight percent dimer acid; and/or the polymerized fatty acid comprises dimer acid and trimer acid; and/or the co-diacid has the formula HOOC—$R^1$—COOH and $R^1$ is a $C_1$–$C_{24}$ aliphatic hydrocarbyl; and/or the co-diacid is selected from adipic acid, pimelic acid, suberic acid, azelaic acid, sebacic acid and 1,4-cyclohexanedicarboxylic acid; and/or the co-diacid is 1,4-cyclohexanedicarboxylic acid; and/or the monoacid has the formula $R^3$—COOH and $R^3$ is a hydrocarbyl group; and/or the monoacid includes a $C_2$–$C_4$ monoacid selected from acetic acid, propionic acid and butanoic acid; and/or the secondary diamine includes piperazine; and/or the $C_6$ diamine is selected from hexamethylene diamine and methylpentamethylenediamine; and/or the reactants further includes one or more auxiliary diamines; and/or the auxiliary diamine is ethylene diamine; and/or the auxiliary diamine includes one or more of ethylenediamine (EDA), 1,2-diaminopropane, 1,3-diaminopropane, 1,4-diaminobutane, 1,2-diamino-2-methylpropane, 1,3-diaminopentane, 1,5-diaminopentane, 2,2-dimethyl-1,3-propanediamine, 1,7-diaminoheptane, 1,8-diaminooctane, 2,5-dimethyl-2,5-hexanediamine, 1,9-diaminononane, 1,10-diaminodecane, 1,12-diaminododecane, diaminophenanthrene (all isomers, including 9,10), 4,4'-methylenebis(cyclohexylamine), 2,7-diaminofluorene, phenylene diamine (1,2; 1,3 and/or 1,4 isomers), adamantane diamine, 2,4,6-trimethyl-1,3-phenylenediamine, 1,3-cyclohexane-bis(methylamine), 1,8-diamino-p-menthane, 2,3,5,6-tetramethyl-1,4-phenylenediamine, diaminonaphthalene (all isomers, including 1,5; 1,8; and 2,3) 4-amino-2,2,6,6-tetramethylpiperidine, xylene diamine and naphthalene diamine (all isomers); and/or polymerized fatty acid contributes 60–95 equivalent percent of the total equivalents provided by polymerized fatty acid, monoacid and co-diacid; and/or monoacid contributes 5–20 equivalent percent of the total equivalents provided by polymerized fatty acid, monoacid and co-diacid; and/or co-diacid contributes 5–15 equivalent percent of the total equivalents provided by polymerized fatty acid, $C_2$–$C_4$ monoacid and co-diacid; and/or $C_6$ diamine contributes 40–80 equivalent percent of the total equivalents provided by $C_6$ diamine and secondary diamine; and/or secondary diamine contributes 20–60 equivalent percent of the total equivalents provided by $C_6$ diamine and secondary diamine; and/or polymerized fatty acid contributes 75–80 equivalent percent of the total acid equivalents of all of the reactants, monoacid contributes 8–15 equivalent percent of the total acid equivalents of all of the reactants, co-diacid contributes 8–15 equivalent percent of the total acid equivalents of all of the reactants, $C_6$ diamine contributes 55–65 equivalent percent of the total amine equivalents of all of the reactants, and secondary diamine contributes 35–45 equivalent percent of the total amine equivalents of all of the reactants, and the total acid equivalents is within 10% of the total amine equivalents.

In another aspect, the present invention provides a process for preparing a polyamide resin comprising condensing reactants that include polymerized fatty acid, co-diacid, monoacid, secondary diamine and $C_6$ diamine, or reactive equivalents thereof, as mentioned above and as described in more detail below.

In another aspect, the present invention provides an ink composition that includes a polyamide resin as described above, and in a further aspect, the ink composition additionally includes nitrocellulose. The ink composition, particularly when the resin is compatible with nitrocellulose, may be useful as a laminating ink resin. When the polyamide resin is not compatible with nitrocellulose, the resin may be formed into an ink for other printing needs, particularly printing onto porous substrate such as paper products. Even if the resin is compatible with nitrocellulose, it may be used to form an ink to be printed onto porous, e.g., paper, substrates.

In another aspect, the present invention provides a method of printing with an ink composition as described above, where in a further aspect, the printing method is a method of printing on film, and may be a method of laminating printing.

In another aspect, the present invention provides an article of manufacture comprising a polyamide resin prepared by the process of reacting together reactants comprising polymerized fatty acid, co-diacid, monoacid, secondary diamine and $C_6$ diamine, or reactive equivalents thereof. The article of manufacture may be, for example, a printed article of manufacture, such as a piece of paper, a cardboard box, a container having printing thereon prepared with the polyamide of the present invention. The polyamides of the present invention have some adhesive properties, and accordingly the article of manufacture may be an article having two components that are adhered together by an intermediate adhesive layer comprising the polyamide of the present invention.

These and related aspects of the invention are described further below.

DETAILED DESCRIPTION OF THE INVENTION

The present invention provides a resin, and in particular a polyamide resin. In a preferred aspect, the polyamide resin of the invention has good compatibility with nitrocellulose. In a preferred aspect, inks containing the polyamide resin of the present invention exhibit good bond strength when printed on films, particularly when used as laminating inks. The polyamide resin of the present invention may, in one respect, be characterized in terms of the reactants that will lead to its formation. These reactants include polymerized fatty acid, co-diacid, monoacid, secondary diamine and $C_6$ diamine, and reactive equivalents thereof. Each of these reactants is discussed in detail below.

The polymerized fatty acid, also known as dimer acid and dimerized fatty acid, is a well-known material of commerce. Polymerized fatty acid is typically formed by heating long-chain unsaturated fatty acids, e.g., $C_{18}$ monocarboxylic acids, to about 200–250° C. in the presence of a clay catalyst in order that the fatty acids polymerize. The polymerization product typically comprises dimer acid, i.e., $C_{36}$ dicarboxylic acid formed by dimerization of the fatty acid, and trimer acid, i.e., $C_{54}$ tricarboxylic acid formed by trimerization of the fatty acid. Polymerized fatty acid is typically a mixture of structures, where individual dimer acids may be saturated, unsaturated, cyclic, acyclic, etc. A more detailed discussion of fatty acid polymerization may be found in, e.g., U.S. Pat. No. 3,157,681 and *Naval Stores—Production, Chemistry and Utilization*, D. F. Zinkel and J. Russell (eds.), Pulp. Chem. Assoc. Inc., 1989, Chapter 23.

Because fatty acid polymerization typically forms much more dimer acid than trimer acid, those skilled in the art sometimes refer to polymerized fatty acid as dimer acid, even though some trimer acid, and even higher polymerization products, may be present in admixture with the dimer acid. For preparing a resin of the present invention, it is preferred that the polymerized fatty acid contain less than about 25 weight percent of trimer acid and high-order polymerization product, based on the total weight of the polymerized fatty acid, and that dimer acid constitute at least about 75 weight percent of the polymerized fatty acid. In one aspect, dimer acid constitutes essentially all of the polymerized fatty acid. In another aspect, dimer acid constitutes 80–90 weight percent of the polymerized fatty acid. Gel permeation chromatographic (GPC) analysis, and optionally high-temperature GPC analysis, provides a measure of the weight percent of dimer acid, and higher-order polymerization product present in the polymerized fatty acid.

Typical unsaturated fatty acids used to form polymerized fatty acid include oleic acid, linoleic acid, linolenic acid, etc. Tall oil fatty acid, which is a mixture containing long-chain unsaturated fatty acids obtained as a byproduct of the wood pulping process, is preferred for preparing polymerized fatty acid useful for preparing resins of the present invention. While tall oil fatty acid is a preferred source of long-chain fatty acid, the polymerized fatty acid may alternatively be prepared by polymerization of unsaturated fatty acids from other sources, e.g., soybeans or canola. The polymerized fatty acid useful in forming a resin of the present invention is a liquid, with an acid number on the order of about 180 to about 200.

The polymerized fatty acid may be hydrogenated prior to being used in the resin-forming reaction. Hydrogenation tends to provide for a slightly higher melting point for the inventive resin, as well as provide the resin with greater oxidative and color stability. Hydrogenated polymerized fatty acid also tends to provide for a lighter colored resin, and is a preferred polymerized fatty acid for use in the practice of the present invention.

Polymerized fatty acid, dimer acid, and hydrogenated versions thereof may be obtained from a number of commercial suppliers. For example, suitable polymerized fatty acids are available commercially as, for example, UNIDYME™ dimer acid and SYLVADYM™ dimer acid from Arizona Chemical, division of International Paper (Jacksonville, Fla.), EMPOL™ dimer acid from Henkel Corporation, Emery Oleochemicals Division (Cincinnati, Ohio); and PRIPOL™ dimer acid from Unichema North America (Chicago, Ill.). A preferred polymerized fatty acid is UNIDYME™ 18 polymerized fatty acid from Arizona Chemical (Jacksonville, Fla.).

The co-diacid has the formula HOOC—$R^1$—COOH, where $R^1$ is an organic group. The $R^1$ group may be aliphatic or aromatic. In one aspect, the $R^1$ group is an alipahtic hydrocarbon (hydrocarbyl). In one aspect, the $R^1$ group is an aliphatic hydrocarbyl having 1–24 carbon atoms. In another aspect, the $R^1$ group is a cycloaliphatic group. Co-diacids suitable for use in the present invention having aliphatic $R^1$ groups include 1,6-hexanedioic acid (adipic acid), 1,7-heptanedioic acid (pimelic acid), 1,8-octanedioic acid (suberic acid), 1,9-nonanedioic acid (azelaic acid), 1,10-decanedioic acid (sebacic acid), 1,11-undecanedoic acid, 1,12-dodecanedioic acid (1,10-decanedicarboxylic acid), 1,13-tridecanedioic acid (brassylic acid) and 1,14-tetradecanedioic acid (1,12-dodecanedicarboxylic acid). Diacids containing cyclic groups are also suitable, e.g., 1,4-cyclohexanedicarboxylic acid (1,4-CHDA), which is a preferred diacid.

The $R^1$ group of the co-diacid may be aromatic. Phthalic acids, e.g., isophthalic acid and terephthalic acid, are exemplary aromatic co-diacids. The aromatic co-diacid may contain aliphatic carbons bonded to the aromatic ring(s), as in HOOC—$CH_2$—Ar—$CH_2$—COOH and the like. The aromatic co-diacid may contain two aromatic rings, which may be joined together through one or more carbon bonds, (e.g., biphenyl with carboxylic acid substitution) or which may be fused (e.g., naphthalene with carboxylic acid substitution).

Suitable co-diacids, both aliphatic and aromatic, are commercially available from, e.g., Aldrich Chemical. 1,4-CHDA is available from Eastman Chemical (www.eastman.com).

The monoacid has the formula $R^2$—COOH, where $R^2$ has 1–22 carbons. In one aspect, the $R^2$ group is a hydrocarbon, i.e., composed entirely of carbon and hydrogen. In one aspect, the $R^2$ group is an unsaturated hydrocarbon, e.g., the monoacid includes tall oil fatty acid (TOFA), where TOFA includes oleic, linoleic and linolenic acids. Some saturated monoacid may be present among the monoacid component, where exemplary saturated monoacids include, without limitation, decanoic acid, dodecanoic acid, myristic acid (tetradecanoic acid), palmitic acid (hexadecanoic acid), stearic acid, (octadecanoic acid), isostearic acid, behenic acid and the like.

In one aspect, the monoacid component includes $C_2$–$C_4$ monoacid, i.e., $R^2$ has 1, 2 or 3 carbons. Suitable $C_2$–$C_4$ monoacids include, without limitation, acetic acid, propionic acid, and butanoic acid. Propionic acid is a preferred $C_2$–$C_4$ monoacid. The $C_2$–$C_4$ monoacid may be a mixture of these or other $C_2$–$C_4$ monoacids. For example, the monoacid may be a mixture of propionic acid and acetic acid. In one aspect, the monoacid is a mixture of $C_2$–$C_4$ monoacid and TOFA.

Such monoacids, including saturated monoacids, unsaturated monoacids (e.g., TOFA) and $C_2$–$C_4$ monoacids are commercially available from, e.g., Aldrich Chemical and Arizona Chemical (Jacksonvile, Fla.).

The secondary diamine is a molecule having two amine groups, where each of the two amine groups is a secondary amine. As used herein and as commonly understood in the art, a secondary amine is a nitrogen atom to which are covalently attached two carbon atoms and one hydrogen atom. A suitable secondary diamine includes, without limitation, piperazine. In one aspect, piperazine is the only secondary diamine present among the reactants.

The $C_6$ diamine is a molecule having exactly six carbon atoms and two amine groups, where those two amine groups are independently selected from primary and secondary amine groups. As used herein and as commonly understood in the art, a primary amine group is a nitrogen atom to which are covalently attached one carbon atom and two hydrogen atoms. Suitable $C_6$ diamines include, without limitation, hexamethylenediamine (also known as 1,6-diaminohexane, or HMDA) and methylpentamethylenediamine (also known as 2-methyl-1,5-pentanediamine).

Some diamine, referred to herein as auxiliary diamine, which is neither secondary diamine nor $C_6$ diamine, may be used in the resin forming reaction. The auxiliary diamine preferably contributes less than 50 percent of the total amine equivalents used to prepare a resin of the invention, and more preferably contributes less than 40 percent, or none of the amine equivalents used to prepare a resin of the invention. When present, auxiliary diamine has two amine groups, either of which may be a primary or a secondary amine.

Exemplary auxiliary diamines include, without limitation, ethylenediamine (EDA), 1,2-diaminopropane, 1,3-diaminopropane, 1,4-diaminobutane, 1,2-diamino-2-methylpropane, 1,3-diaminopentane, 1,5-diaminopentane, 2,2-dimethyl-1,3-propanediamine, 1,7-diaminoheptane, 1,8-diaminooctane, 2,5-dimethyl-2,5-hexanediamine, 1,9-diaminononane, 1,10-diaminodecane, 1,12-diaminododecane, diaminophenanthrene (all isomers, including 9,10), 4,4'-methylenebis(cyclohexylamine), 2,7-diaminofluorene, phenylene diamine (1,2; 1,3 and/or 1,4 isomers), adamantane diamine, 2,4,6-trimethyl-1,3-phenylenediamine, 1,3-cyclohexanebis(methylamine), 1,8-diamino-p-menthane, 2,3,5,6-tetramethyl-1,4-phenylenediamine, diaminonaphthalene (all isomers, including 1,5; 1,8; and 2,3) 4-amino-2,2,6,6-tetramethylpiperidine, xylene diamine and naphthalene diamine (all isomers).

Amine compounds useful in the present invention, including secondary diamine, $C_6$ diamine, and auxiliary diamine may be obtained from commercial sources, such as Witco Corporation (Greenwich, Conn.; www.witco.com); Akzo Nobel Chemicals, Surface Chemistry (Chicago, Ill.; www.akzonobelusa.com); and Aldrich (Milwaukee, Wis.; www.aldrich.sial.com).

Reactive equivalents of polymerized fatty acid, co-diacid, monoacid, secondary diamine, $C_6$ diamine, auxiliary monoacid and/or auxiliary diamine may be used in the practice of the present invention. For example, esters and diesters may be substituted for some or all of the "acidic reactants" (i.e., polymerized fatty acid, co-diacid, and monoacid), where "esters" and "diesters" refer to the esterification product of an acidic reactant with hydroxyl-containing molecules. However, such diesters are preferably prepared from relatively volatile hydroxyl-containing molecules, in order that the hydroxyl-containing molecule may be easily removed from the reaction vessel subsequent to diamine reacting with the diester. A lower alkyl ester or diester, e.g., the esterification or diesterification product of an acidic reactant as defined herein and a $C_{1-4}$ monohydric alcohol (e.g., methanol, ethanol, propanol and butanol), may be used in place of some or all of the acid reactant in the polyamide-forming reaction of the invention. The acid halide of the acidic reactant may likewise be employed in place of some or all of the acidic reactant, however such a material is typically much more expensive and difficult to handle compared to the acidic reactant itself, and thus the acidic reactant, rather than the reactive equivalent, is typically preferred. While such reactive equivalents may be employed in the reaction, their presence is not preferred because such equivalents introduce undesired reactive groups into the reaction vessel. In some instances however, a reactive equivalent may be preferred for cost or handling reasons, e.g., phthalic acid sublimes while the corresponding acid chloride does not.

In order to prepare the resin of the present invention from reactants including polymerized fatty acid, co-diacid, monoacid, secondary diamine and $C_6$ diamine, or reactive equivalents thereof as described above, it is important to control the stoichiometry of the reactants. In the following discussion regarding reactant stoichiometry, the terms "equivalent(s)" and "equivalent percent" will be used, and are intended to have their standard meanings as employed in the art. However, for additional clarity, it is noted that equivalents refer to the number of reactive groups present in a molar quantity of a molecule, such that a mole of a dicarboxylic acid has two equivalents of carboxylic acid, while a mole of diamine has two equivalents of amine. Furthermore, it is emphasized that the dimerized fatty acid has only two reactive groups (both carboxyl groups), the co-diacid has two reactive groups (both carboxyl groups), the monoacid has one reactive group (a carboxyl group), the secondary diamine has two reactive groups (both amine groups, and in particular, both secondary amine group), and the $C_6$ diamine has two reactive groups (both amine groups, selected from primary and secondary amine groups), and these are preferably, although not necessarily, the only reactive materials present in the reaction mixture.

The polymerized fatty acid contributes 60–95 equivalent percent of the reactant acid equivalents, preferably 70–85 equivalent percent, and still more preferably at least 75 equivalent percent of the total acid equivalents. When the polymerized fatty acid component falls below about 75 equivalent percent, the adhesion of the resulting ink to the substrate tends to diminish. Together, the co-diacid and monoacid contribute a total of 10–30 equivalent percent of the reactant acid equivalents. Preferably, co-diacid contributes 5–15 equivalent percent, and monoacid contributes 5–20 equivalent percent, where the equivalent percent contributed by co-diacid may or may not be equal to the equivalent percent contributed by monoacid. As used herein, the reactant acid equivalents refers to the total acid equivalents provided by polymerized fatty acid, co-diacid and monoacid. Preferably, the reactant acid equivalents equal the total equivalents of carboxylic acid provided by the sum of all the carboxylic acid-containing materials used in the preparation of a resin of the present invention. That is, preferably, polymerized fatty acid, co-diacid and monoacid together contribute 100% of the acid equivalents used to prepare a resin of the present invention. In one embodiment, polymerized fatty acid, monoacid and co-diacid together contribute at least 90% of the total acid equivalents that react to form a resin of the present invention.

The $C_6$ diamine contributes 40–80 equivalent percent of the reactant amine equivalents, preferably 50–70 equivalent percent, and most preferably about 60 equivalent percent. The secondary diamine contributes 20–60 equivalent percent of the reactant amine equivalents, preferably 30–50 equivalent percent, and most preferably about 40 equivalent percent. As used herein, the reactant amine equivalents refers to the total amine equivalents provided by $C_6$ diamine and secondary diamine. Preferably, the reactant amine equivalents equal the total equivalents of amine (primary and secondary) provided by the sum of all the amine-containing materials used in the preparation of a resin of the present invention. That is, preferably, $C_6$ diamine and secondary diamine together contribute 100% of the amine equivalents used to prepare a resin of the present invention.

In one embodiment, $C_6$ diamine and secondary diamine contribute at least 50% of the total amine equivalents that react to form a resin of the present invention, with the remaining up to 50% of the total amine equivalents being contributed by auxiliary diamine. In another embodiment, $C_6$ diamine and secondary diamine contribute at least 75% of the total amine equivalents that react to form a resin of the present invention, with the remaining up to 25% of the total amine equivalents being contributed by auxiliary diamine.

In a particularly preferred embodiment, polymerized fatty acid contributes 75–80 equivalent percent, more preferably about 78 equivalent percent of the total acid equivalents, while monoacid contributes 8–15 equivalent percent, more preferably about 12 equivalent percent of the total acid equivalents, while co-diacid contributes 8–15 equivalent percent, more preferably about 10 equivalent percent of the total acid equivalents, while $C_6$ diamine contributes 55–65 equivalent percent, more preferably about 60 equivalent percent of the total amine equivalents, and secondary diamine contributes 35–45 equivalent percent, more preferably about 40 equivalent percent of the total amine equivalents. These and other equivalent percent values described herein effectively control the molecular weight of the polyamide resin: when the molecular weight of the resin becomes too high, the resin becomes incompatible with nitrocellulose, however when the molecular weight becomes too low, the polyamide does not provide effective bond strength to the substrate. In this particularly preferred embodiment, it is preferred that the polymerized fatty acid is UNIDYME™ 18 polymerized fatty acid, and/or the monoacid includes propionic acid, and/or the co-diacid includes 1,4-cyclohexanedicarboxylic acid, and/or the $C_6$ diamine includes hexamethylenediamine, and/or the secondary diamine includes piperazine.

As described herein, polymerized fatty acid, co-diacid, monoacid, secondary diamine and $C_6$ diamine are preferred starting materials to form the compounds and compositions of the present invention. These starting materials are preferably reacted together with a stoichiometry, and under reaction conditions, such that the acid number of the resulting reaction product is less than 25, preferably less than 15, and more preferably less than 10, while the amine number is preferably less than 10, more preferably less than 5, and still more preferably less than 1. The progress of the reaction may be monitored by periodically withdrawing samples and measuring the acid number of the samples. Techniques to measure an acid number are well known in the art. See, e.g., ASTM D-465 (1982). Typically, a 4–8 hour reaction time at about 200–220° C. can provide a polyamide of the present invention having an acid number of less than about 25.

To prepare a polyamide of the invention, the acids and amine are combined and reacted together. As used herein, "reacted together" means to combine the reactants to form a reaction mixture, and maintain this mixture at an elevated temperature to achieve polyamide formation. Any order of combination is suitable, and heating rate is not particularly important. The final heating temperature is suitably about 150° C. to about 250° C. At temperatures below about 150° C., the rate of product formation is undesirably slow, while temperatures above about 250° C. can cause some reactant and/or product degradation, resulting in dark colored product.

Upon heating, water vapor will be evolved as the amidification reaction occurs. Preferably, the water vapor is condensed and removed from the reaction mixture as soon as it forms, thus driving the reaction to completion. A gentle flow of an inert gas, nitrogen for example, may be passed through the reaction flask in order to facilitate removal of the water vapor. Alternatively, the water vapor is removed by application of a modest vacuum of about 20–200 mtorr, or by co-distillation of an inert process solvent (e.g., co-distillation of xylene) with use of a Dean Stark trap.

A catalyst may be used to speed up the amidification reaction, where suitable catalysts are well known in the art and include sulfuric acid, phosphoric acid and other inorganic acids, metal hydroxides and alkoxides such as tin oxide and titanium iso-propoxide, and divalent metal salts such as tin or zinc salts. When a catalyst is present, it should be used in small amounts, e.g., less than about 5 weight percent of the total mass of the reaction mixture, preferably less than about 2% and more preferably less than about 1% of the total mass of the reaction mixture. Excessive amounts of catalyst increase the cost of preparing the polyamide and may darken the product.

Thus, the present invention provides a resin prepared by a process that includes the step of reacting together various reactants to provide a reaction mixture, where those reactants include polymerized fatty acid and/or reactive equivalent thereof, co-diacid and/or reactive equivalent thereof, monoacid and/or reactive equivalent thereof, secondary diamine and/or reactive equivalent thereof, and $C_6$ diamine and/or reactive equivalent thereof. The relative amounts of the reactants, and the duration of the reaction period, should be such that the resulting composition has an acid number of less than 25. In order to be used in printing, the composition should be placed in admixture with an image-forming component.

The following procedure may be used to determine whether a polyamide resin of the present invention is compatible with nitrocellulose. A 25 wt % nitrocellulose solution is prepared by combining (by weight) 35.7 parts of 70 wt % nitrocellulose (¼ second, ss grade, from Hercules Incorporation (Wilmington, Del.; www.herc.com) or equivalent), 10 parts ethyl acetate and 54.3 parts ethanol. A 40 wt % polyamide solution is prepared by combining (by weight) 40 parts polyamide resin, 24 parts heptane, 12 parts ADE (anhydrous denatured ethanol), 18 parts iso-propanol, and 6 parts n-propanol. Various blends of nitrocellulose and polyamide solutions are prepared, e.g., solutions having 1:1 (e.g., (by weight) 19.2 parts polyamide solution+30.8 parts nitrocellulose solution), 2:1 (e.g., (by weight) 27.8 parts polyamide solution+22.2 parts nitrocellulose solution), 3:1 (e.g., (by weight) 32.6 parts polyamide solution+17.4 parts nitrocellulose solution), 4:1 (e.g., (by weight) 35.7 parts polyamide solution+14.3 parts nitrocellulose solution), 6:1 (e.g., (by weight) 39.5 parts polyamide solution+10.5 parts nitrocellulose solution), 10:1 (e.g., (by weight) 43.1 parts polyamide solution+6.9 parts nitrocellulose solution) weight polyamide:weight nitrocellulose. The combined polyamide and nitrocellulose solution is placed on a paint shaker for 10 minutes, and then poured into a glass jar where it is allowed to sit undisturbed for 60 minutes. The appearance of the solution is evaluated, where a bright and clear solution indicates good compatibility between the polyamide and nitrocellulose. The solution is further evaluated by allowing the solution to sit undisturbed for 24 hours, then inverting the jar over and observing the contents. Polyamide resins with good compatibility with nitrocellulose will appear clear to slightly hazy and will flow smoothly when the jar is inverted. Polyamide resins that are incompatible with nitrocellulose will appear extremely cloudy and/or phase separated, and/or will evidence a gel-like or stringy consistency.

In one aspect, the polyamide resin of the invention is compatible with nitrocellulose at polyamide:nitrocellulose weight ratios of 1:1 and greater. The compatability with nitrocellulose, and suitability for use as a resin for a laminating ink, is enhanced when the resin is prepared under conditions such that polymerized fatty acid contributes 75–80 equivalent percent, more preferably about 78 equivalent percent of the total acid equivalents, while monoacid contributes 8–15 equivalent percent, more preferably about 12 equivalent percent of the total acid equivalents, while co-diacid contributes 8–15 equivalent percent, more preferably about 10 equivalent percent of the total acid equivalents, while $C_6$ diamine contributes 55–65 equivalent percent, more preferably about 60 equivalent percent of the total amine equivalents, and secondary diamine contributes 35–45 equivalent percent, more preferably about 40 equivalent percent of the total amine equivalents. In this particularly preferred embodiment, it is preferred that the polymerized fatty acid is UNIDYME™ 18 polymerized fatty acid, and/or the monoacid includes propionic acid, and/or the co-diacid includes 1,4-cyclohexanedicarboxylic acid, and/or the $C_6$ diamine includes hexamethylenediamine, and/or the secondary diamine includes piperazine.

Because preferred polyamide resins of the present invention display good compatibility with nitrocellulose, these polyamide resins may be incorporated into inks that also contain nitrocellulose. Accordingly, in one aspect, the present invention provides ink, and a varnish precursor to ink, which contains both nitrocellulose and polyamide of the invention. Because preferred polyamide resins of the present invention display good adhesion to plastic film, e.g., polyethylene and polypropylene, and display good cohesive strength when sandwiched between two sheets of plastic film, these polyamide resins may be incorporated into inks useful as laminating inks. Accordingly, in one aspect, the present invention provides ink formulated to function as laminating ink, and a method of laminating printing using these inks. In another aspect, the present invention provides ink that contains both polyamide of the invention and nitrocellulose, and that is formulated to function as laminating ink, as well as methods of printing that utilize these inks. Thus, the present invention provides methods of preparing inks and varnishes, as well as methods of printing with these inks. In another aspect, the ink is formulated for printing onto paper. In another aspect, the ink is formulated for printing onto film, e.g., polyethylene. Formulation of polyamide-containing inks for these different applications is well known in the art, and such formulations may be used to prepare inks using the resins of the present invention.

Nitrocellulose-based pigment dispersions are commercially available, from, e.g., Sun Chemical or other suppliers. In one aspect, the present invention provides a process that includes mixing together a nitrocellulose-based pigment dispersion and a polyamide resin of the present invention. The polyamide resin may, if desired, be predissolved in a suitable solvent prior to being mixed with the nitrocellulose-based pigment dispersion. Suitable solvents include, without limitation, ethanol, iso-propanol, n-propanol, heptane, ethyl acetate and toluene. The two components are mixed together until they are homogeneous, which can be readily accomplished by placing the mixture in a can, on a paint shaker, for about one hour.

Another aspect of the invention is a printing composition comprising an image-forming component and a polyamide as described above. The image-forming component is a material that may be detected or observed by any means. A colorant is a preferred image-forming component, where colorants may be visually detected by the human eye, or by an optical character reading device. Both dyes and pigments are suitable colorants.

The polyamide resin typically constitutes about 0.5 to about 40 weight percent of the printing ink composition, and preferably about 1 to about 20 weight percent of the ink composition. The image-forming component typically constitutes about 0.1–3 weight percent, preferably about 0.3–2 weight percent of the printing ink composition. The solvent typically constitutes the bulk of the printing ink composition, where suitable solvents are one or a mixture of ethanol, iso-propanol, n-propanol, heptane, ethyl acetate, and toluene.

The printing ink composition of the invention may contain ingredients in addition to colorant and polyamide. For example, when the printing ink is used for printing onto fil, and in particular for laminating printing, the ink may and preferably does contain nitrocellulose. A suitable nitrocellulose for a printing ink composition of the invention is 70 wt % nitrocellulose (¼ second, ss grade, from Hercules Incorporation (Wilmington, Del.; www.herc.com).

Other ingredients that may be present in the printing ink composition for laminate printing include, in addition to solvent, one or more of a plasticizer, tackifier, surfactant, dispersing agent, antioxidant, rheology modifier and UV stabilizer.

Accordingly, the present invention provides a composition that includes an image-forming agent and a polyamide resin of the present invention. In another aspect, the composition further includes nitrocellulose.

Printing ink compositions of the present invention may generally be prepared simply by combining the desired ingredients to form a mixture, and then mixing the components together, typically with agitation. Commonly, the components are combined in a paint can, with steel shot also present within the can, and the can is placed on a paint shaker for a suitable length of time, typically 30–90 minutes. Effective mixing can typically be achieved at room temperature. Mixing may also occur in a ball mill or an atritor. See, e.g., U.S. Pat. Nos. 5,658,968; and 5,338,785, which provide additional discussion regarding the preparation of nitrocellulose-containing inks.

The printing ink composition of the invention may be used to print on a wide variety of substrates, which may be porous or non-porous. Exemplary substrates include plastics, plastic laminates, glass, metal, paper, wood, etc. In one aspect, the printing ink composition is deposited onto plastic, e.g., polyethylene and polypropylene.

Thus, in one aspect, the invention provides a method of printing which includes the step of contacting a substrate with ink, where the ink includes an image-forming component and a polyamide resin as described above. In a further aspect, the ink also includes nitrocellulose.

In another aspect, the present invention provides an article of manufacture comprising a polyamide resin prepared by the process of reacting together reactants comprising polymerized fatty acid, co-diacid, monoacid, secondary diamine and $C_6$ diamine, or reactive equivalents thereof, and preferred embodiments thereof as set forth herein. The article of manufacture may be, for example, a printed article of manufacture, such as a piece of paper, a cardboard box, a container having printing thereon prepared with the polyamide of the present invention. The polyamides of the present invention have some adhesive properties, and accordingly the article of manufacture may be an article having two components that are adhered together by an intermediate adhesive layer comprising the polyamide of the present invention.

The following Examples are set forth as a means of illustrating the present invention and are not to be construed as a limitation thereon. In the following Examples, softening points were measured using a Model FP83HT Dropping Point Cell from Mettler Instruments Corporation, with a heating rate of 1.5° C./min. Viscosity measurements were made using a Model RVTD Digital Viscometer from Brookfield Engineering Laboratories, Inc., and are reported in centipoise (cP or cps). Nitrocellulose compatibility was judged qualitatively as described above. Unless otherwise noted, the chemicals were of reagent grade as obtained from commercial supply houses including Aldrich Chemical Co. (Milwaukee, Wis.) and the like.

EXAMPLES

Example 1

A reaction flask was charged with 1,818.5 g (78 equivalent percent acid) UNIDYME™ 18 polymerized fatty acid, 71.3 g (12 equivalent percent acid) propionic acid, 69.0 g (10 equivalent percent acid) 1,4-cyclohexane dicarboxylic acid, and 0.25 g phosphoric acid, and the mixture heated to 110° C. at which temperature 138.0 g (40 equivalent percent amine) piperazine was added. Heating of the mixture was continued until about 145° C., at which temperature 403.1 g (60 equivalent percent amine) hexamethylenediamine was added. The temperature of the mixture was gradually raised to 220° C. over about 4 hours, and then vacuum of about 40 mm Hg was applied to remove volatiles. The product was discharged from the flask and characterized as follows: Gardner color of 6–(30% non-volatiles in n-propanol); Gardner-Holt viscosity at 25° C. was E–(30% non-volatiles in n-propanol); appearance was bright and clear (30% non-volatiles in n-propanol); viscosity using Brookfield viscometer on sample at 160° C. was 3820 centipoise; acid number was 6.5; amine number was 5.5; softening point was 125.7° C. The gel drop and gel recovery characteristics of this resin were determined as described above, with the following results. Gel drop was 70 minutes, while gel recovery was 80 minutes. The nitrocellulose compatibility of the resin was determined as described above, with the following results. A 3:1 PA:NC blend demonstrated good initial compatibility. This blend continued to demonstrate good compatibility after storage for 24 hours.

Example 2

The procedure of Example 1 was essentially repeated using UNIDYME™ 18 polymerized fatty acid (78.0 equivalent percent acid), propionic acid (6 equivalent percent acid), acetic acid (6 equivalent percent acid), cyclohexanedicarboxylic acid (10.0 equivalent percent acid), piperazine (60 equivalent percent amine) and diaminopropane (40 equivalent percent amine). The product was characterized as follows: Gardner color of 5–(30% non-volatiles in n-propanol); Gardner-Holt viscosity at 25° C. was D–E (30% non-volatiles in n-propanol); appearance was bright and clear (30% non-volatiles in n-propanol); acid number was 5.8; amine number was 4.1; softening point was 118.1° C. The gel drop and gel recovery characteristics of this resin were determined as described above, with the following results. Gel drop was 44 minutes, while gel recovery was 57 minutes. The nitrocellulose compatibility of the resin was determined as described above, with the following results. A 3:1 PA:NC blend demonstrated good initial compatibility. This blend continued to demonstrate good compatibility after storage for 24 hours.

Example 3

The procedure of Example 1 was essentially repeated using UNIDYME™ 18 polymerized fatty acid (78.0 equivalent percent acid), propionic acid (12 equivalent percent acid), cyclohexanedicarboxylic acid (10.0 equivalent percent acid), hexamethylenediamine (30 equivalent percent), piperazine (40 equivalent percent amine) and ethylenediamine (30 equivalent percent amine). The product was characterized as follows: Gardner color of 5–(30% non-volatiles in n-propanol); Gardner-Holt viscosity at 25° C. was D (30% non-volatiles in n-propanol); appearance was bright and clear (30% non-volatiles in n-propanol); acid number was 3.3; amine number was 3; softening point was 107.1° C. The nitrocellulose compatibility of the resin was determined as described above, with the following results. A 3:1 PA:NC blend demonstrated good initial compatibility. This blend continued to demonstrate good compatibility after storage for 24 hours.

Example 4

The procedure of Example 1 was essentially repeated using UNIDYME™ 18 polymerized fatty acid (78.0 equivalent percent acid), propionic acid (12 equivalent percent acid), cyclohexanedicarboxylic acid (10.0 equivalent percent acid), hexamethylenediamine (20 equivalent percent), piperazine (40 equivalent percent amine) and ethylenediamine (40 equivalent percent amine). The product was characterized as follows: Gardner color of 4–5 (30% non-volatiles in n-propanol); Gardner-Holt viscosity at 25° C. was C–(30% non-volatiles in n-propanol); appearance was bright and clear (30% non-volatiles in n-propanol); acid number was 1; amine number was 6; softening point was 132.7° C., and the viscosity at 160° C. was 3870 cps. The gel drop and gel recovery characteristics of this resin were determined as described above, with the following results. Gel drop was 9 minutes, while gel recovery was 22 minutes. The nitrocellulose compatibility of the resin was determined as described above, with the following results. A 3:1 PA:NC blend demonstrated good initial compatibility. This blend continued to demonstrate good compatibility after storage for 24 hours.

Example 5

The procedure of Example 1 was essentially repeated using UNIDYME™ 18 polymerized fatty acid (68.0 equivalent percent acid), propionic acid (12 equivalent percent acid), cyclohexanedicarboxylic acid (10.0 equivalent percent acid), azaleic acid (10 equivalent percent), hexamethylenediamine (60 equivalent percent), and piperazine (40 equivalent percent amine). The product was characterized as follows: Gardner color of 5–(30% non-volatiles in n-propanol); Gardner-Holt viscosity at 25° C. was D+(30% non-volatiles in n-propanol); appearance was bright and clear (30% non-volatiles in n-propanol); acid number was 4.3; amine number was 3; softening point was 114.8° C., and the viscosity at 160° C. was 3940 cps. The gel drop and gel recovery characteristics of this resin were determined as described above, with the following results. Gel drop was 49 minutes, while gel recovery was 62 minutes. The nitrocellulose compatibility of the resin was determined as described above, with the following results. A 3:1 PA:NC blend demonstrated good initial compatibility. This blend continued to demonstrate good compatibility after storage for 24 hours.

Example 6

The procedure of Example 1 was essentially repeated using UNIDYME™ 18 polymerized fatty acid (78.0 equivalent percent acid), propionic acid (12 equivalent percent acid), cyclohexanedicarboxylic acid (10.0 equivalent percent acid), MPMD (40 equivalent percent amine), and piperazine (40 equivalent percent amine). The product was characterized as follows: Gardner color of 6+(30% non-volatiles in n-propanol); Gardner-Holt viscosity at 25° C. was D–E (30% non-volatiles in n-propanol); appearance was bright and clear (30% non-volatiles in n-propanol); acid number was 2.6; amine number was 1.8; softening point was 68.4° C., and the viscosity at 160° C. was 4640 cps. The nitrocellulose compatibility of the resin was determined as described above, with the following results. A 3:1 PA:NC blend demonstrated good initial compatibility. This blend continued to demonstrate good compatibility after storage for 24 hours.

Example 7

The procedure of Example 1 was essentially repeated using UNIDYME™ 18 polymerized fatty acid (75.5 equivalent percent acid), propionic acid (12 equivalent percent acid), cyclohexanedicarboxylic acid (12.5 equivalent percent acid), hexamethylene diamine (60 equivalent percent amine), and piperazine (40 equivalent percent amine). The product was characterized as follows: Gardner color of 5+(30% non-volatiles in n-propanol); Gardner-Holt viscosity at 25° C. was D+(30% non-volatiles in n-propanol); appearance was bright and clear (30% non-volatiles in n-propanol); acid number was 4.3; amine number was 3.3; softening point was 145.6° C., and the viscosity at 160° C. was 11,300 cps. The nitrocellulose compatibility of the resin was determined as described above, with the following results. A 3:1 PA:NC blend demonstrated good initial compatibility. This blend continued to demonstrate good compatibility after storage for 24 hours.

Throughout the present specification, where reaction mixtures are described as including or comprising specific components or materials, it is contemplated by the inventors that the reaction mixture may alternatively consist essentially of, or consist of, the recited components or materials. Accordingly, throughout the present disclosure any described composition (e.g., the reactants from which the polyamides of the invention are formed) of the present invention can consist essentially of, or consist of, the recited components or materials.

As used herein, the word "a" in association with the word it precedes, e.g., "a resin" or "a co-diacid", refers to "one or more". That is "a solvent" may be a mixture of chemicals, each of which could function as a solvent, and that together also functions as a solvent. Likewise, "a $C_6$ diamine" refers to one, or a mixture of two or more $C_6$ diamines. Accordingly, as used herein, the word "a" is not synonymous with the word "one".

All publications and patent applications mentioned in this specification are herein incorporated by reference to the same extent as if each individual publication or patent application was specifically and individually incorporated by reference.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A polyamide resin prepared by the process of reacting together reactants comprising polymerized fatty acid, co-diacid, monoacid, secondary diamine and $C_6$ diamine, or reactive equivalents thereof, where the co-diacid comprises 1,4-cyclohexanedicarboxylic acid, and where polymerized fatty acid contributes 60–95 equivalent percent of the total equivalents provided by polymerized fatty acid, monoacid and co-diacid.

2. A polyamide resin prepared by the process of reacting together reactants comprising polymerized fatty acid, co-diacid, monoacid, secondary diamine and $C_6$ diamine, or reactive equivalents thereof, where the co-diacid comprises 1,4-cyclohexanedicarboxylic acid, and where monoacid contributes 5–20 equivalent percent of the total equivalents provided by polymerized fatty acid, monoacid and co-diacid.

3. A polyamide resin prepared by the process of reacting together reactants comprising polymerized fatty acid, co-diacid, monoacid, secondary diamine and $C_6$ diamine, or reactive equivalents thereof, where the co-diacid comprises 1,4-cyclohexanedicarboxylic acid, and where co-diacid contributes 5–15 equivalent percent of the total equivalents provided by polymerized fatty acid, $C_2$–$C_4$ monoacid and co-diacid.

4. A polyamide resin prepared by the process of reacting together reactants comprising polymerized fatty acid, co-diacid, monoacid, secondary diamine and $C_6$ diamine, or reactive equivalents thereof, where the co-diacid comprises 1,4-cyclohexanedicarboxylic acid, and where $C_6$ diamine contributes 40–80 equivalent percent of the total equivalents provided by $C_6$ diamine and secondary diamine.

5. A polyamide resin prepared by the process of reacting together reactants comprising polymerized fatty acid, co-diacid, monoacid, secondary diamine and $C_6$ diamine, or reactive equivalents thereof, where the co-diacid comprises 1,4-cyclohexanedicarboxylic acid, and where secondary diamine contributes 20–60 equivalent percent of the total equivalents provided by $C_6$ diamine and secondary diamine.

6. A polyamide resin prepared by the process of reacting together reactants comprising polymerized fatty acid, co-diacid, monoacid, secondary diamine and $C_6$ diamine, or reactive equivalents thereof, where the co-diacid comprises 1,4-cyclohexanedicarboxylic acid, and where polymerized fatty acid contributes 75–80 equivalent percent of the total acid equivalents of all of the reactants, monoacid contributes 8–15 equivalent percent of the total acid equivalents of all of the reactants, co-diacid contributes 8–15 equivalent percent of the total acid equivalents of all of the reactants, $C_6$ diamine contributes 55–65 equivalent percent of the total amine equivalents of all of the reactants, and secondary diamine contributes 35–45 equivalent percent of the total amine equivalents of all of the reactants, and the total acid equivalents is within 10% of the total amine equivalents.

7. The resin of any of claims 2–6 wherein the monoacid has the formula $R^3$—COOH and $R^3$ is a hydrocarbyl group.

8. The resin of any of claims 2–6 wherein the monoacid comprises a C2–C4 monoacid selected from acetic acid, propionic acid, or butanoic acid.

9. The resin of any of claims 2–6 wherein the secondary diamine comprises piperazine.

10. The resin of any of claims 2–6 wherein the $C_6$ diamine is selected from hexamethylene diamine or methylpentamethylenediamine.

11. The resin of any of claims 2–6 wherein the reactants further comprise ethylene diamine.

12. An ink composition comprising nitrocellulose and a polyamide resin prepared by the process of reacting together reactants comprising polymerized fatty acid, co-diacid, monoacid, secondary diamine and $C_6$ diamine, or reactive equivalents thereof, wherein the co-diacid comprises 1,4-cyclohexanedicarboxylic acid.

* * * * *